US011588425B1

(12) United States Patent
Blair

(10) Patent No.: US 11,588,425 B1
(45) Date of Patent: Feb. 21, 2023

(54) SYSTEM AND METHOD FOR PREDICTING RELIABILITY AND MAINTENANCE OF A SOLAR TRACKER BASED ON VARYING CONTROL TORQUE

(71) Applicant: Heliogen Holdings, Inc., Pasadena, CA (US)

(72) Inventor: Jason Blair, La Crescenta, CA (US)

(73) Assignee: Heliogen Holdings, Inc., Pasadena, CA (US)

( * ) Notice: Subject to any disclaimer, the term of this patent is extended or adjusted under 35 U.S.C. 154(b) by 0 days.

(21) Appl. No.: 16/874,113

(22) Filed: May 14, 2020

Related U.S. Application Data

(60) Provisional application No. 62/849,014, filed on May 16, 2019.

(51) Int. Cl.
*H02P 8/16* (2006.01)
*G02B 7/182* (2021.01)
*H02P 8/34* (2006.01)
*H02S 20/32* (2014.01)

(52) U.S. Cl.
CPC ............. *H02P 8/16* (2013.01); *G02B 7/1821* (2013.01); *H02P 8/34* (2013.01); *H02S 20/32* (2014.12)

(58) Field of Classification Search
CPC ................................. H02S 20/32; F24S 50/00
See application file for complete search history.

(56) References Cited

U.S. PATENT DOCUMENTS

| 9,236,751 B2* | 1/2016 | Goei ..................... H02S 20/00 |
| 10,190,804 B2* | 1/2019 | O'Neill ................ F24S 30/452 |
| 2012/0193512 A1* | 8/2012 | Wu ...................... G01S 3/7861 |
| | | 250/203.4 |
| 2013/0008431 A1* | 1/2013 | Fitch ..................... F24S 40/85 |
| | | 126/601 |
| 2018/0017288 A1* | 1/2018 | Abdel-Hady ........... F24S 23/74 |
| 2018/0347879 A1* | 12/2018 | Tada ..................... F04B 49/065 |
| 2021/0028743 A1* | 1/2021 | Yamamoto ............. H02S 50/00 |

* cited by examiner

*Primary Examiner* — Said Bouziane
(74) *Attorney, Agent, or Firm* — Knobbe, Martens, Olson & Bear LLP

(57) ABSTRACT

A system and method for reducing power consumption and increasing reliability in a solar tracking system is disclosed. The solar tracker comprises a panel, at least one actuator configured to control the orientation of the panel, and a tracking controller. The tracking controller is configured to determine a minimum operating current for the at least one actuator based on a range of motion of the panel, and energize the at least one actuator based on the minimum operating current. The tracking controller determines the minimum operating current based on the range of motion of the panel, specifically the minimum current need to drive the panel through a measured range of motion equal to or substantially similar to the full mechanical range of motion of the panel. Based on the minimum operating current, solar tracker may generate messages to repair or replace an actuator or gearbox, for example.

10 Claims, 4 Drawing Sheets

SYSTEM AND METHOD FOR PREDICTING RELIABILITY AND MAINTENANCE OF A SOLAR TRACKER BASED ON VARYING CONTROL TORQUE

CROSS-REFERENCE TO RELATED APPLICATION(S)

This application claims the benefit of U.S. Provisional Patent Application Ser. No. 62/849,014 filed May 16, 2019, titled "System and method for predicting reliability and maintenance of a solar tracker based on varying control torque," which is hereby incorporated by reference herein for all purposes.

TECHNICAL FIELD

The invention generally relates to a tracking controller used to keep a photovoltaic panel or mirror pointed in the proper direction with respect to the sun over the course of the day. In particular, the invention relates to a tracking controller for reducing power consumption during tracking operations and predicting maintenance requirements.

BACKGROUND

Heliostats are designed to track the sun over the course of a day and collect solar energy. Large fields of heliostats are deployed to either aim photovoltaic panels at the sun or aim mirrors so as to reflect sunlight to a solar receiver. The orientation of these panels or mirrors is regulated using tracking controllers and actuators. These actuators consume an appreciable amount of energy over the course of the day. These actuators are also subject to harsh environments and periodically need repair or replacement. There is therefore a need for a tracking technique that reduces the amount of energy consumed to collect solar power and minimizes down time due to mechanical failures.

SUMMARY

The invention in the preferred embodiment features a novel system and method for reducing power consumption and increasing reliability in a solar tracking system. In one embodiment, the solar tracker comprises: a panel; at least one actuator configured to control the orientation of the panel; and a tracking controller. The tracking controller is configured to determine a minimum operating current for the at least one actuator based on a range of motion of the panel; and energize the at least one actuator based on the minimum operating current. The panel may be a photovoltaic panel or mirror configured to collect sunlight over the course of the day. The at least one actuator may include a stepper motor or other type of electric actuator.

The tracking controller determines the minimum operating current based on the range of motion of the panel, specifically the minimum current need to drive the panel through a measured range of motion equal, or substantial equal, to the full mechanical range of motion of the panel. The tracking controller is configured to determine a minimum operating current based on the measured range of motion of the panel and a mechanical range of motion. The mechanical range of motion of the panel is based on an angular range between physical hard stops. The angular range of motion may correspond to, for example, an elevation angle or an azimuth angle.

In another embodiment, the invention is a method of conserving power in a solar tracker, the solar tracker comprising a rotatable panel and at least one actuator configured to rotate the panel. The method comprises: determining a minimum operating current for at least one actuator based on a measured range of motion of the panel; energizing the at least one actuator based on the minimum operating current; comparing the minimum operating current for the at least one actuator to a predetermined threshold; and generating a failure prediction for the at least one actuator if the minimum operating current exceeds the predetermined threshold. The failure prediction may include, for example, a message indicating the need for repair of the at least one actuator and gearbox, or include a message indicating need to replace the at least one actuator and gearbox.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
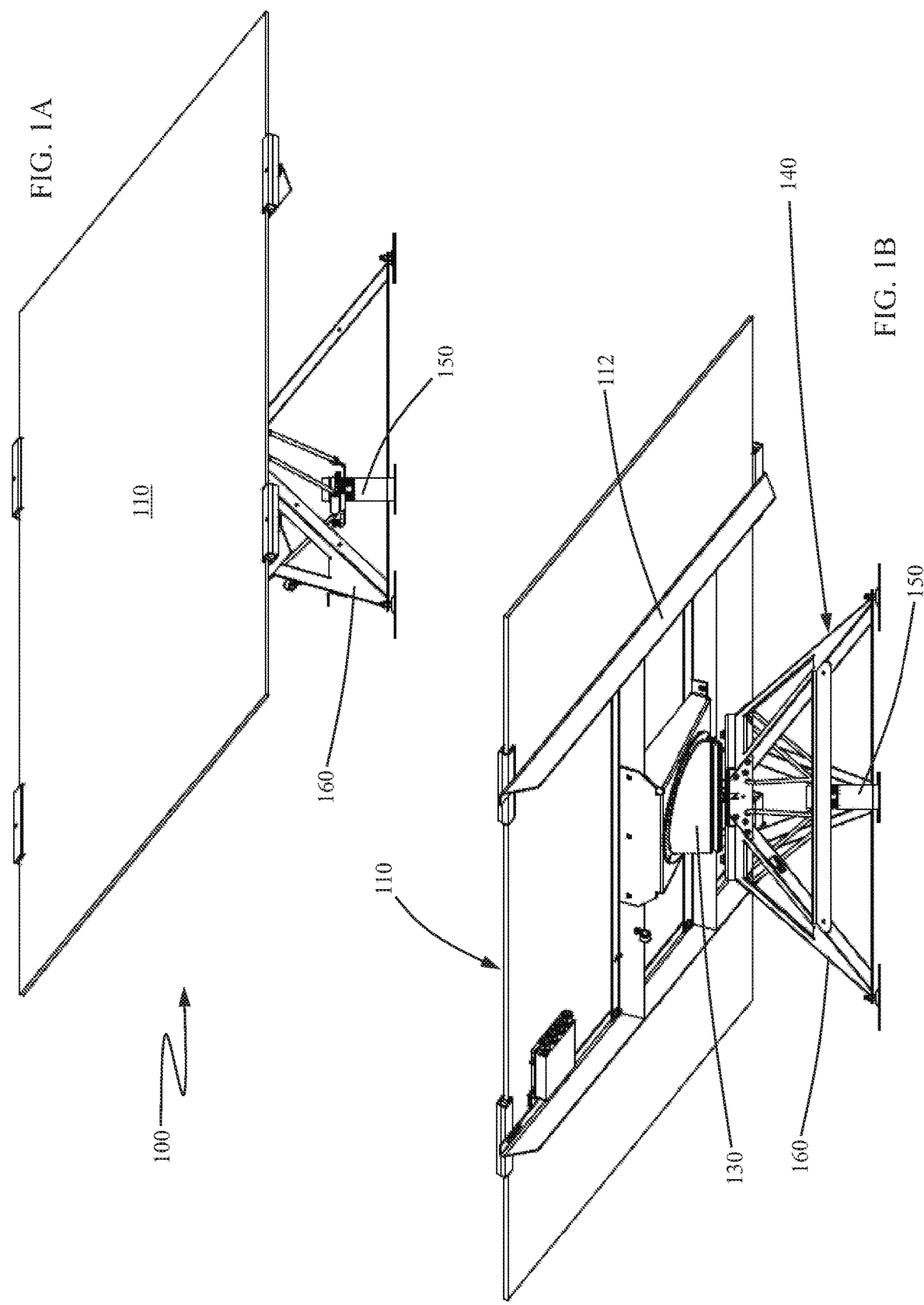
FIG. 1A is a front perspective view of a solar tracker with a solar panel, in accordance with a preferred embodiment of the present invention.
FIG. 1B is a back perspective view of a solar tracker with a solar panel, in accordance with a preferred embodiment of the present invention.

Illustrated in FIGS. 1A and 1B are perspective views of a solar tracker with solar panel. The solar tracker 100 includes a photovoltaic (PV) panel 110 mounted to a frame 112 that is coupled to a base 140 via a housing 130. The base includes a (i) center post 150 rigidly affixed to the roof, for example, via bolts and adhesive, as well as a (ii) tripod 160 that sits atop the roof by means of footings. The housing 130 protectively conceals a tracking controller (not shown), at least one actuator (not shown), and one or more pivotable connections. In the preferred embodiment, the tracking controller is configured to energize the at least one actuator (e.g., an elevation actuator and/or an azimuth actuator)) to rotate the PV panel 110 about one or two axis for purposes of keeping the panel facing the sun over the course of the day. The at least one actuator may include a stepper motor and step-down gearbox, for example.

Figure 2:
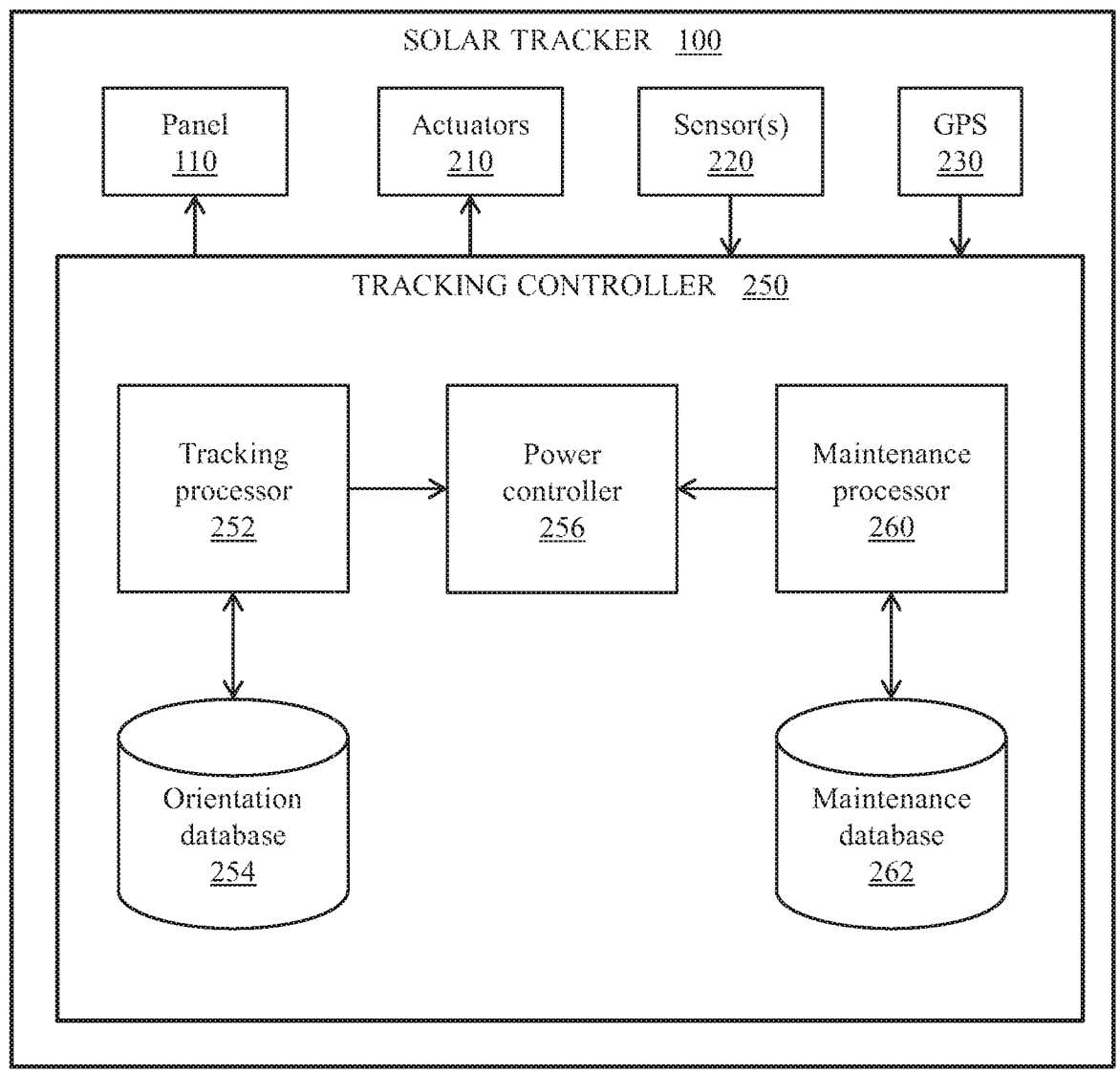
FIG. 2 is a functional block diagram of a tracking controller, in accordance with a preferred embodiment of the present invention.

Illustrated in FIG. 2 is a functional block diagram of a tracking controller 200 configured to aim the PV panel 110 and detect performance and/or maintenance issues with the associated actuators 210. The tracking controller 200 in the preferred embodiment comprises a tracking processor 252, orientation database 254, power controller 256, maintenance processor 260, and maintenance database 262. The tracking controller is configured to estimate the varying control torque necessary to drive the stepper motors and gearbox based on the operational current required to move the panel. From this current, the tracking control can minimize energy consumption and predict mechanical failures before they occur.

The primary purpose of the tracking processor 252 is to energize one or more actuators 210 to keep the PV panel 110 aimed at the sun over the course of the day and optimize the collection of sunlight. The tracking processor 252 may drive the panel 110 and follow the sun based on feedback from one or more sensors 220, or may drive the panel 110 to follow the sun based on a tracking algorithm using the tracking data in orientation database 254 as well as the geographic location of the heliostat 110 as determined by the global positioning system (GPS) device 230. Based on the desired orientation of the panel 110, the tracking processor 252 signals the power controller 256 to deliver current to energize the one or more actuators 210 accordingly. When energized, the one or more actuators change the orientation of the panel 110 to track the sun.

The maintenance processor 260 in the preferred embodiment is configured to measure the minimum actuator operating current and/or drive torque of each actuator 210 over time for purposes of optimizing power consumption and predicting possible failure of the tracker before actual failure. In the preferred embodiment, the maintenance processor 260 searches for the minimum actuator operating current sufficient to drive the panel 110 through its full range of motion. This minimum actuator operating current, which changes over time, is recorded at some periodic interval, e.g., daily, weekly, or monthly. If and when the operating current exceeds some predetermined threshold due to wear on the bearings or gears, for example, the maintenance processor 260 generates an alert that the failure of the tracker is possible/probable and repair/replacement is recommended.

In one preferred embodiment, the one or more actuators 210 are stepper motors although various other types of motors and actuators may be employed with the present invention. The tracking controller 250 periodically measures the drive torque of the motors) and compares each drive torque to a baseline measurement made when the tracker 100 was installed, for example. When measured with no external wind loads, the drive torque measurement indicates the internal load on the stepper motors when moving the panel 110, In practice, the tracking controller 250 varies the magnitude of the motor current and determines whether the motor can move without stalling at each current level. The minimum motor operating current, is defined as the minimum motor current at which the motor has enough torque available to drive the PV panel 110 through its range of motion without stalling. When operating at this minimum current, the motor drive torque is approximately linearly proportional to the current magnitude. Therefore, the minimum motor operating current may be used as a proxy for the drive torque measurement.

Figure 3:
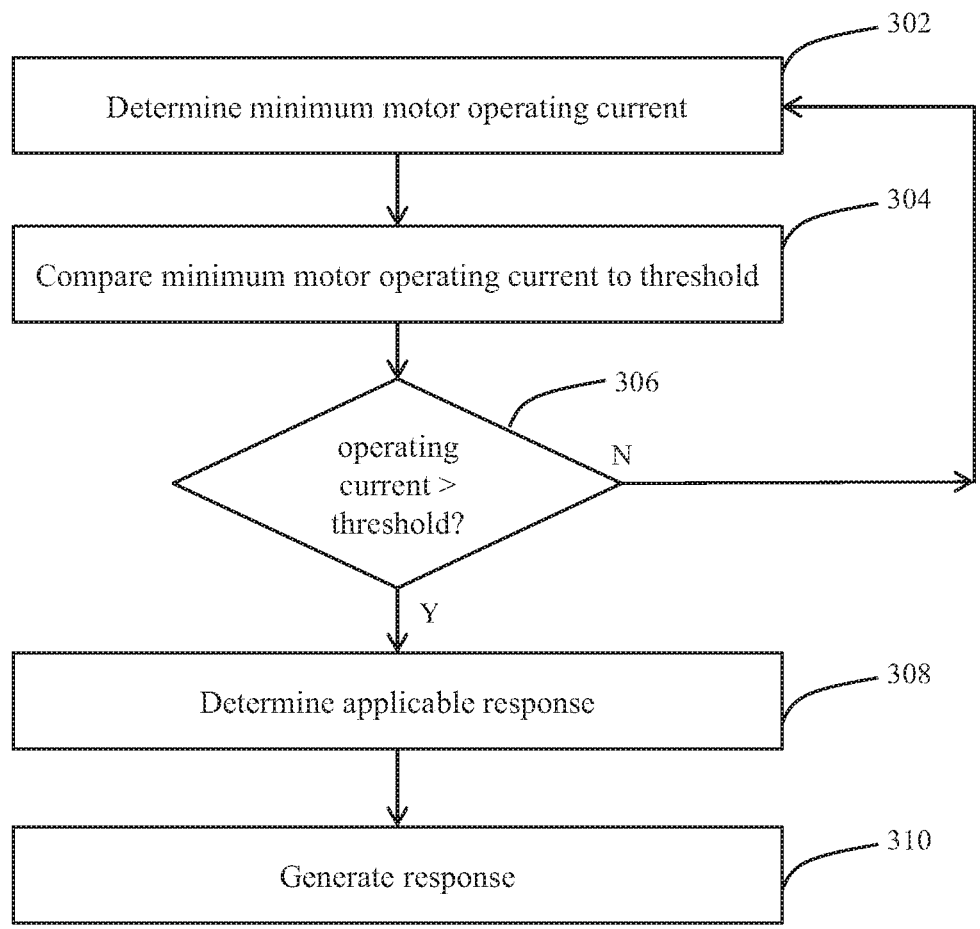
FIG. 3 is a flowchart of a process of responding to a maintenance condition, in accordance with a preferred embodiment of the present invention.

Illustrated in FIG. 3 is a flowchart of a process of detecting and responding to an actuator failure prediction condition. First, the maintenance processor 260 measures 302 the minimum operating current of each of the one or more actuators 210 that control the orientation of the PV panel 110. The maintenance processor 260 then compares 304 the measured minimum operating current to a predetermined current threshold. If the measured minimum operating current is not greater than a predetermined current threshold, decision block 306 is answered in the negative and no action taken. If the measured minimum operating current is greater than a predetermined current threshold, decision block 306 is answered in the affirmative.

Once the minimum operating current rises above the threshold, the maintenance processor 260 has effectively predicted that the associated actuator is likely to fail. When a failure is predicted in advance of actual failure, the maintenance processor 260 uses the measured minimum operating current to query 308 the maintenance database 262 for the applicable response. In the preferred embodiment, the maintenance processor 260 is configured to (a) increase the operating current for the actuator to compensate for additional wear and tear on the mechanical systems, and/or (b) schedule 310 the actuator for servicing and/or replacement within a predetermined period of time.

Power Reduction

To increase the normal motor operating current supplied to the stepper motors 210, the maintenance database 262 configures the power controller 256 to energize the associated stepper motors 210 with increased current when aiming the PV panel 110. The increased current insures that the driving current is sufficient to overcome any additional friction due to wear and tear on the gearbox or other hardware, for example.

Although the new operating current of the stepper motors 210 may be increased periodically, the new operating current is generally lower than the default motor operating current to which the stepper motors 210 would normally be set in the absence of the maintenance processor 260. That is, without the maintenance processor 260 to finely tune the current, a high default operating current would be used to generate the required output, torque even at the lowest expected gearbox efficiency. By using the minimum current necessary to actuate the panel 110, however, the maintenance processor 260 reduces the overall power consumption by the solar tracker 100. Moreover, with minimum motor operating current optimized for each individual solar tracker, the motor current setting is optimized for each tracker based on variations in gearbox efficiency and internal load. The overall power reduction for a field of solar trackers is substantial.

Failure Prediction

Over time, the internal load of a tracker's stepper motors 210 can change as the actuators and other components wear, age, and/or degrade due to environmental factors including moisture and dust, for example. Periodic measurement of the internal load as described above can be used to detect degradation and schedule maintenance before a tracker experiences mechanical failure, thus making the tracker inoperable. For example, when the minimum motor operating current exceeds a predetermined threshold associated with motor failure, the stepper motor may be repaired or replaced, thereby avoiding failure of the motor and inoperability of the tracker. The predetermined threshold may set, in part, based on safety margins and environmental factors including wind loading and dust levels, for example.

Figure 4:
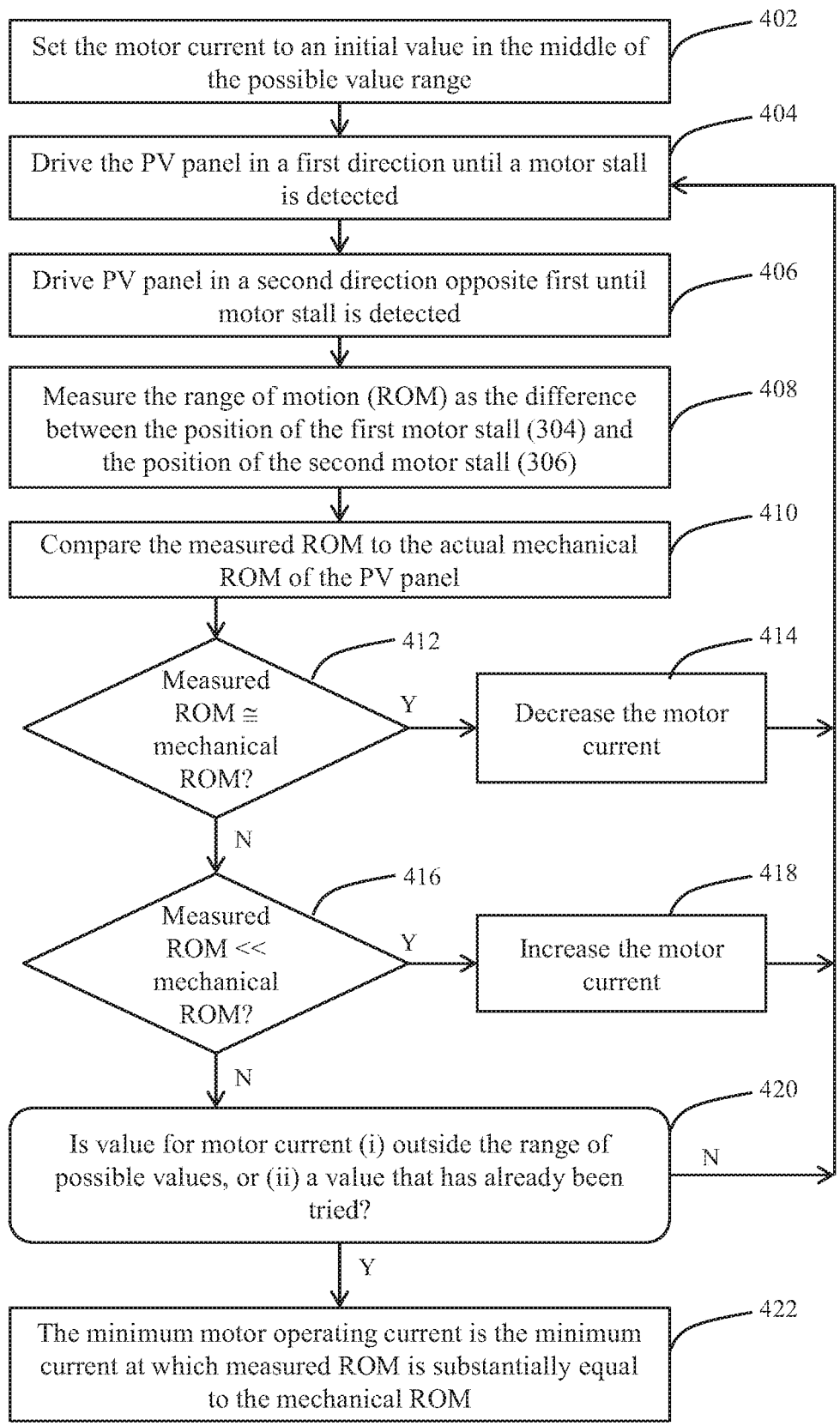
FIG. 4 is a flowchart of a process of determining a minimum motor operating current, in accordance with a preferred embodiment of the present invention.

Illustrated in FIG. 4 is a flowchart of a process of determining a minimum operating current, specifically the minimum motor operating current. To measure the minimum motor current for a motor 210 or other actuator, the maintenance processor 260 performs the following sequence. First, the maintenance processor 260 sets 402 the motor current to an initial value in the middle of the possible value range for purposes of testing. This current value is an initial guess, Which is then evaluated and refined over multiple iterations explained below.

The tracking controller then drives 404 the PV panel in a first direction until a motor stall is detected, and records the position. The tracking controller then drives 406 the PV panel in a second direction, opposite the first, until a motor stall is detected, and records the position. If the stepper motor 210 controls the elevation angle of the PV panel 110, for example the first and second directions are the direction of a positive elevation angle and negative elevation angle, respectively.

Figure 5:
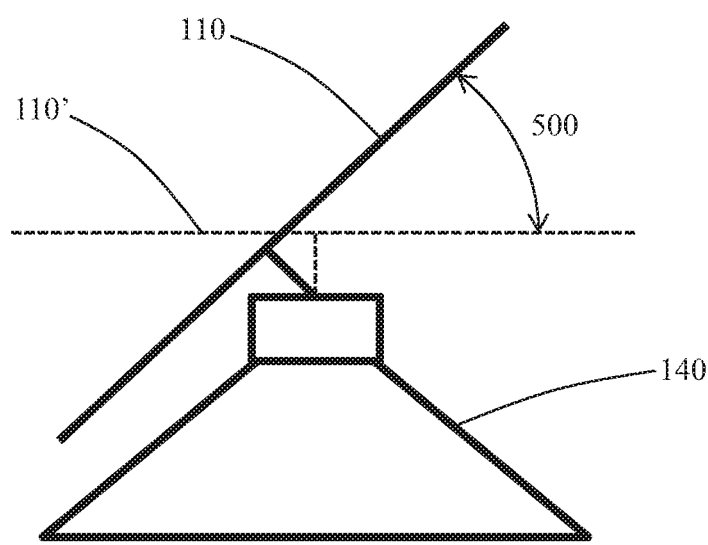
FIG. 5 is a diagrammatic illustration of the range of motion of a PV panel in a heliostat, in accordance with a preferred embodiment of the present invention.

The maintenance processor 260 then determines 408 the range of motion (ROM), which is the difference between the position of the motor stall determined in step 404 and the position of the motor stall found in step 406. The maintenance processor 260 compares this measured ROM to the actual mechanical ROM of the PV panel. The actual mechanical ROM of the PV panel, as illustrated in FIG. 5, is the angular range 500 between physical hard stops associated with the position of maximum elevation angle of panel 110 and position of minimum elevation angle of panel 110'.

If the measured ROM is close or substantially equal to the mechanical ROM, decision block 412 is answered in the affirmative and the maintenance processor 260 decreases 414 the motor operating current being evaluated and repeats step 404 through step 408. That is, if the measured ROM is much less than the mechanical ROM, decision block 416 is answered in the affirmative and the maintenance processor 260 increases 414 the motor current and repeats step 404 through step 408.

The maintenance processor 260 repeats step 404 through decision block 416 until the next value for motor current is either outside the range of possible values or is a value that has already been tried. When the next value for motor current is either outside the range of possible values or is a value that has already been tried, decision block 420 is answered in the affirmative. Thereafter, the minimum motor operating current is the minimum current at which the measured ROM is close, i.e., substantially equal, to the mechanical ROM. The minimum motor operating current is then provided as the output step 304 of FIG. 3 for purposes of predicting failure of the stepper motor(s) controlling the panel elevation angle.

The following is an example of a process of determining a minimum motor operating current. In this scenario, the actual minimum operating current is 37 milli-amperes. To ensure that the algorithm terminates and converges properly, the size by which the operating current is incremented/decremented should be no less than some discrete motor current size (for integer motor current settings, the step size would be 1 milli-ampere).

Assuming the operating current for the particular stepper motor being evaluated ranges between 0 milli-ampere and 100 milli-amperes, the maintenance processor 260 estimates an initial minimum operating current of 50 milli-amperes in step 402. At 50 milli-amperes, the measured ROM is sufficient to drive the panel 110 through its full range of motion. In this case, the measured ROM is substantially equal to the mechanical ROM, Decision block 412 is then answered in the affirmative and the estimated minimum operating current reduced 414, In the preferred embodiment, the estimated operating current is decreased (or increased) in a non-linear manner based on the integer value of half the range of the untested motor current values. As such, the estimated minimum operating current is 25 milli-amperes (equal to (50−0)/2).

For 25 milli-amperes, the measured ROM is substantially less than the mechanical ROM because it is insufficient to drive panel through its full mechanical range of motion. Decision block 416 is therefore answered in the affirmative and the estimated minimum operating current increased by 12 milli-amperes (equal to (50−25)/2) to 37 milli-amperes.

For 37 milli-amperes, the measured ROM is substantially equal to the mechanical ROM. Decision block 412 is answered in the affirmative and the estimated minimum operating current reduced by 6 milli-amperes (equal to (37−25)/2) to 31 milli-amperes.

For 31 milli-amperes, the measured ROM is substantially less than the mechanical ROM. Decision block 416 is answered in the affirmative and the estimated minimum operating current increased by 3 milli-amperes (equal to (37−31)/2) to 34 milli-amperes.

For 34 milli-amperes, the measured ROM is substantially less than the mechanical ROM, Decision block 416 is answered in the affirmative and the estimated minimum operating current increased by 1 milli-amperes (equal to integer value of (37−34)/2) to 35 milli-amperes.

For 35 milli-amperes, the measured ROM is substantially less than the mechanical ROM. Decision block 416 is answered in the affirmative and the estimated minimum operating current increased by 1 milli-amperes (equal to (37−35)/2) to 36 milli-amperes.

For 36 milli-amperes, the measured ROM is substantially less than the mechanical ROM. Decision block 416 is answered in the affirmative and the estimated minimum operating current increased by 1 milli-amperes (equal to (37−36)/2) to 37 milli-amperes, where 0.5 is rounded up because zero is less than a discrete step size.

Since 37 milli-amperes has already been test above, decision block 420 is answered in the affirmative and the minimum motor operating current set equal to 37 milli-amperes. As explained above, 37 milli-amperes is the minimum drive current necessary to aim the panel 110 and is therefore used by the power controller 256 as the optimum current for energizing the associated stepper motor when updating the panel 110 orientation. Since 37 milli-amperes is less than the 100 milli-ampere default current used to drive the stepper motor 210 of the solar tracker 100, there is a net savings in power used to track the sun over the course of the day.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer, processor, electronic circuit, or module capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including electronic circuits such as personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A solar tracker comprising:
    a panel:
        at least one actuator configured to control the orientation of the panel; and a tracking controller configured to:
            a) determine a minimum operating current for the at least one actuator based on comparing a measured angular range of motion of the panel operated at a selected current magnitude with a mechanical range of motion corresponding to an angular range of motion of the panel between physical stops, wherein the minimum operating current is determined with no external wind loads on the solar tracker by varying the selected current magnitude until a lowest current magnitude is determined to actuate the panel over the angular range of motion, said lowest current magnitude set as the minimum operating current and being lower than a default operating current for the actuator;
            b) energize the at least one actuator based on the minimum operating current to reduce power consumption;
            c) determine a predetermined threshold greater than the minimum operating current; wherein the predetermined threshold is based on wear on the solar tracker; and
            d) generate a failure prediction for the at least one actuator if and when the minimum operating current exceeds the predetermined threshold; wherein the failure prediction is associated with failure of the solar tracker due to wear, age, and/or degrade due to environmental factors.

2. The solar tracker of claim 1, wherein the at least one actuator comprises a stepper motor.

3. The solar tracker of claim 1, wherein the angular range comprises an elevation angle.

4. The solar tracker of claim 1, wherein the angular range comprises an azimuth angle.

5. The solar tracker of claim 1, wherein the panel comprises a photovoltaic panel.

6. The solar tracker of claim 1, wherein the panel comprises a mirror.

7. A method of conserving power in a solar tracker, the solar tracker comprising a rotatable panel and at least one actuator configured to rotate the panel, the method comprising:
    determining a minimum operating current for at least one actuator based on comparing a measured angular range of motion of the panel operated at a selected current magnitude with a mechanical range of motion corresponding to an angular range of motion of the panel between physical stops; wherein the minimum operating current is determined based on an internal load of the solar tracker by varying the selected current magnitude until a lowest current magnitude is determined to actuate the panel over the angular range of motion, said lowest current magnitude set as the minimum operating current and being lower than a default operating current for the actuator;
    energizing the at least one actuator based on the minimum operating current to reduce power consumption;
    comparing the minimum operating current for the at least one actuator to a predetermined threshold; and
    generating a failure prediction for the at least one actuator if and when the minimum operating current exceeds the predetermined threshold;
    wherein the failure prediction is associated with failure of the solar tracker due to wear, age, and/or degrade due to environmental factors.

8. The method of claim 7, wherein the failure prediction comprises a message indicating a need to repair or replace the at least one actuator.

9. The method of claim 7, further comprising a gearbox, wherein the failure prediction comprises a message indicating a need to repair or replace the gearbox.

10. The method of claim 7, wherein the at least one actuator comprises a motor, and wherein the minimum operating current is a minimum motor operating current.

* * * * *

UNITED STATES PATENT AND TRADEMARK OFFICE
CERTIFICATE OF CORRECTION

| | | |
|---|---|---|
| PATENT NO. | : 11,588,425 B1 | Page 1 of 1 |
| APPLICATION NO. | : 16/874113 | |
| DATED | : February 21, 2023 | |
| INVENTOR(S) | : Jason Blair | |

It is certified that error appears in the above-identified patent and that said Letters Patent is hereby corrected as shown below:

In the Specification

On Column 2, Line 55: Delete "actuator))" and insert -- actuator) --.

On Column 3, Line 41: Delete "motors)" and insert -- motor(s) --.

On Column 3, Line 46: Delete "110," and insert -- 110. --.

On Column 4, Line 31: Delete "output," and insert -- output --.

On Column 4, Line 64: Delete "Which" and insert -- which --.

On Column 5, Line 37: Delete "ROM," and insert -- ROM. --.

On Column 5, Line 47: After "current" insert -- step --.

On Column 5, Line 56: Delete "ROM," and insert -- ROM. --.

On Column 5, Line 58: Delete "414," and insert -- 414. --.

On Column 6, Line 14: Delete "ROM," and insert -- ROM. --.

In the Claims

On Column 8, Line 29 (Approx.): In Claim 7, delete "the al" and insert -- the at --.

Signed and Sealed this
Thirtieth Day of May, 2023

Katherine Kelly Vidal
*Director of the United States Patent and Trademark Office*